United States Patent [19]
Tsang et al.

[11] Patent Number: 5,619,591
[45] Date of Patent: Apr. 8, 1997

[54] ENCODING AND DECODING COLOR IMAGE DATA BASED ON MEAN LUMINANCE AND AN UPPER AND A LOWER COLOR VALUE

[75] Inventors: Wai M. Tsang, North Point; Ching K. Chan, Yuen Long, both of Hong Kong

[73] Assignee: Vtech Electronics, Ltd., Hong Kong, Hong Kong

[21] Appl. No.: 518,581

[22] Filed: Aug. 23, 1995

[51] Int. Cl.$^6$ .............................. H04N 11/02; G06K 9/00
[52] U.S. Cl. ........................... 382/166; 382/233; 382/237
[58] Field of Search .................................. 382/166, 232, 382/233, 236, 237, 270; 358/429, 432, 433, 539; 348/384, 390, 391, 396; 341/50, 56; H04N 11/02

[56] References Cited

U.S. PATENT DOCUMENTS

| | | | |
|---|---|---|---|
| 4,673,977 | 6/1987 | Stelzenmuller | 358/133 |
| 4,974,071 | 11/1990 | Maeda | 358/80 |
| 5,003,307 | 3/1991 | Whiting et al. | 341/51 |
| 5,016,009 | 5/1991 | Whiting et al. | 341/67 |
| 5,070,532 | 12/1991 | Faul et al. | 382/56 |
| 5,126,739 | 6/1992 | Whiting et al. | 341/106 |
| 5,146,221 | 9/1992 | Whiting et al. | 341/67 |
| 5,214,718 | 5/1993 | Khosla | 382/22 |

*Primary Examiner*—Andrew Johns
*Attorney, Agent, or Firm*—Dick and Harris

[57] ABSTRACT

A method for encoding and decoding still video frames, and a sequence of frames of digitized motion picture video data, using inter-frame analysis. Sequences of frames are encoded by first subdividing each frame within a set of adjacent frames into a plurality of blocks, each corresponding to at least one other block within at least one adjacent frame, so as to create a group of corresponding of blocks. A luminance component of each pixel within each group of corresponding blocks is averaged to generate a mean luminance value for each group of corresponding blocks. An upper color value for each group of corresponding blocks is determined, as well as a lower color value. A one-bit value is assigned to each pixel within each block. The one-bit value is set to a first binary level when the luminance component of an associated pixel value is greater in magnitude than the corresponding mean luminance value. The one-bit value is set to a second binary level when the luminance component of an associated pixel value is not greater in magnitude than the corresponding mean luminance value. In this manner, sets of adjacent frames may be represented in encoded form by a one-bit per pixel matrix, with a single upper color value and a single lower color value for each group of blocks.

10 Claims, 7 Drawing Sheets

ENCODING AND DECODING COLOR IMAGE DATA BASED ON MEAN LUMINANCE AND AN UPPER AND A LOWER COLOR VALUE

BACKGROUND OF THE INVENTION

The present invention relates, in general, to data compression and, more particularly, to a method for encoding and decoding still video frames and a sequence of frames of digitized motion picture video data.

Methods for compressing, or encoding, digitized video data have been known in the art for some time. One well-known method for compressing individual digitized images is the JPEG (Joint Photographic Expert Group) method. A well-known method for encoding a sequence of frames of digitized motion picture video data is the MPEG (Motion Picture Expert Group) method. While the MPEG compression method generally provides visually acceptable results with respect to the compressed and decompressed video image, relatively sophisticated hardware is required in order to perform the compression and decompression methods. In particular, the MPEG standard specifies the use of a discrete cosine transformation (DCT) to perform data compression, as well as an inverse discrete cosine transformation (IDCT) to perform the data decompression method. The DCT and IDCT transformations each require a significant number of multiply-accumulate operations, which, in turn, requires relatively complex dedicated hardware, or relatively high speed digital signal processors or microprocessors, to perform the required method.

Another prior art method for encoding individual video frames is the block truncation coding (BTC) method. A flow diagram of the prior art BTC method is shown in FIG. 1 of the drawings. In the BTC method, each pixel of an image is subdivided into its red, green, and blue color components. Each frame is subdivided into square blocks and then further subdivided into respective red, green, and blue component sub-blocks, each containing a single color component for pixels in the associated block. Two quantization intensities, (an upper intensity and a lower intensity), are determined for each sub-block. The red, green, and blue color components of each pixel are then quantized so as to be represented by either the upper or lower quantization intensity for its associated sub-block. In this manner, a video frame may be represented by three bit-mapped matrices, having three bits for each pixel in the corresponding video frame, plus a plurality of upper and lower quantization values.

While this prior art BTC coding method provides for satisfactory compression and decompression of individual images, a relatively large number of bits are required to represent the image in encoded form. Moreover, relatively sophisticated encoding and decoding hardware, or a relatively high level of processing speed, is required in order to calculate the quantization values.

In addition, the prior art block truncation coding method is directed to the encoding and decoding of individual images, and is not optimized for sequences of digitized motion picture video data. For example, the prior art BTC compression and decompression methods do not take advantage of the similarities which often occur within the content of adjacent, related frames of digitized motion picture video data.

Accordingly, it is an object of the present invention to provide a method for encoding and subsequently decoding a sequence of digitized motion picture video data, wherein a relatively small number of bits of information is required in order to represent the frames of video data in compressed, encoded form.

It is another object of the present invention to provide a method for compressing and subsequently decompressing frames of digitized motion picture video data, wherein interframe analysis is employed to take advantage of similarities in adjacent video frames.

It is yet another object of the present invention to provide a method for encoding and subsequently decoding still video frames, wherein a relatively small number of bits of information is required in order to represent the still frames in compressed, encoded form.

These and other objects and features of the present invention will become apparent in light of the present specification, claims, and drawings.

SUMMARY OF THE INVENTION

The present invention comprises a method for encoding a sequence of frames of digitized motion picture video data. The sequence of frames contains a plurality of sets of proximately-positioned frames within the sequence. Each frame within the sequence of frames contains a plurality of digital pixel values.

Each frame within each set of proximately-positioned frames of digitized motion picture video data is divided into a plurality of blocks of pixels, with each block corresponding to at least one other block within at least one proximately-positioned frame, so as to create a plurality of groups of corresponding blocks. A luminance component of each of the pixel values within each group of corresponding blocks is averaged to generate a mean luminance value for each group of corresponding blocks.

An upper color value for each group of corresponding blocks is determined, with the upper color value being equal to a combination of averages of color components of pixels within the group of corresponding blocks having a luminance component greater in magnitude than the mean luminance component for the group of corresponding blocks. A lower color value for each group of corresponding blocks is determined, with the lower color value being equal to a combination of averages of color components of pixels within the group of corresponding blocks having a luminance component which is not greater in magnitude than the mean luminance component for the group of corresponding blocks.

The luminance components of each pixel within each block is compared with the mean luminance value for the corresponding group of blocks. A one-bit value in a one-bit per pixel matrix is set to a first binary level when the luminance component of an associated pixel value is greater in magnitude than the corresponding mean luminance value, and is set to a second binary level when the luminance component of an associated pixel value is not greater in magnitude than the corresponding mean luminance value.

In this manner, each set of proximately-positioned frames may be represented in encoded form by a one-bit per pixel matrix for each frame, a single upper color value for each group of blocks, and a single lower color value for each group of blocks.

In a preferred embodiment, each of the sets of proximately-positioned frames comprises two non-consecutive frames. In another preferred embodiment, each of the sets of proximately-positioned frames comprises two consecutive frames. Moreover, in a preferred embodiment, the color components comprise a red color component, a green color component, and a blue color component.

The present invention also comprises a method for decoding an encoded sequence of frames of digitized motion picture video data to produce a decoded sequence of frames containing a plurality of sets of consecutive frames, with each frame within the sequence of frames containing a plurality of digital pixel values representing a plurality of pixels.

Each frame within each set of consecutive frames is divided into a plurality of blocks of pixels, with each block corresponding to at least one other block within a consecutive frame so as to create a plurality of groups of corresponding blocks. The encoded sequence of frames includes an upper color value for each group of corresponding blocks, a lower color value for each group of corresponding blocks, and a sequence of one-bit values, with each one-bit value corresponding to a pixel.

The upper color value is equal to a combination of averages of color components of pixels within the group of corresponding blocks having a luminance component greater in magnitude than a mean luminance component for the group of corresponding blocks. The lower color value is equal to a combination of averages of color components of pixels within the group of corresponding blocks having a luminance component which is not greater in magnitude than the mean luminance component for the group of corresponding blocks.

Each one-bit value is set to a first binary level when a luminance component of an associated pixel value is greater in magnitude than the corresponding mean luminance value, and is set to a second binary level when the luminance component of the associated pixel value is not greater in magnitude than the corresponding mean luminance value.

Each one-bit value of the sequence of one-bit values is tested to determine if it has a value indicative of an upper color value. The upper color value for a group of corresponding blocks is assigned to each one-bit value in the sequence of one-bit values which is within the group of corresponding blocks and has a value indicative of an upper color value. The lower color value for a group of corresponding blocks is assigned to each one-bit value in the sequence of one-bit values which is within the group of blocks and has a value indicative of an lower color value.

In a preferred embodiment, the decoding method further includes filtering the decoded sequence of frames by averaging values of adjacent pixels within each decoded frame. Moreover, the filtering of the decoded sequence of frames by averaging values of adjacent pixels within each decoded frame preferable comprises averaging red color component values of adjacent pixels within each decoded frame to form a mean red value; averaging green color component values of adjacent pixels within each decoded frame to form a mean green value; averaging blue color component values of adjacent pixels within each decoded frame to form a mean blue value; and combining the mean red value, mean green value, and mean blue value to form a filtered value for the adjacent pixels.

DETAILED DESCRIPTION OF THE DRAWINGS

Figure 1:
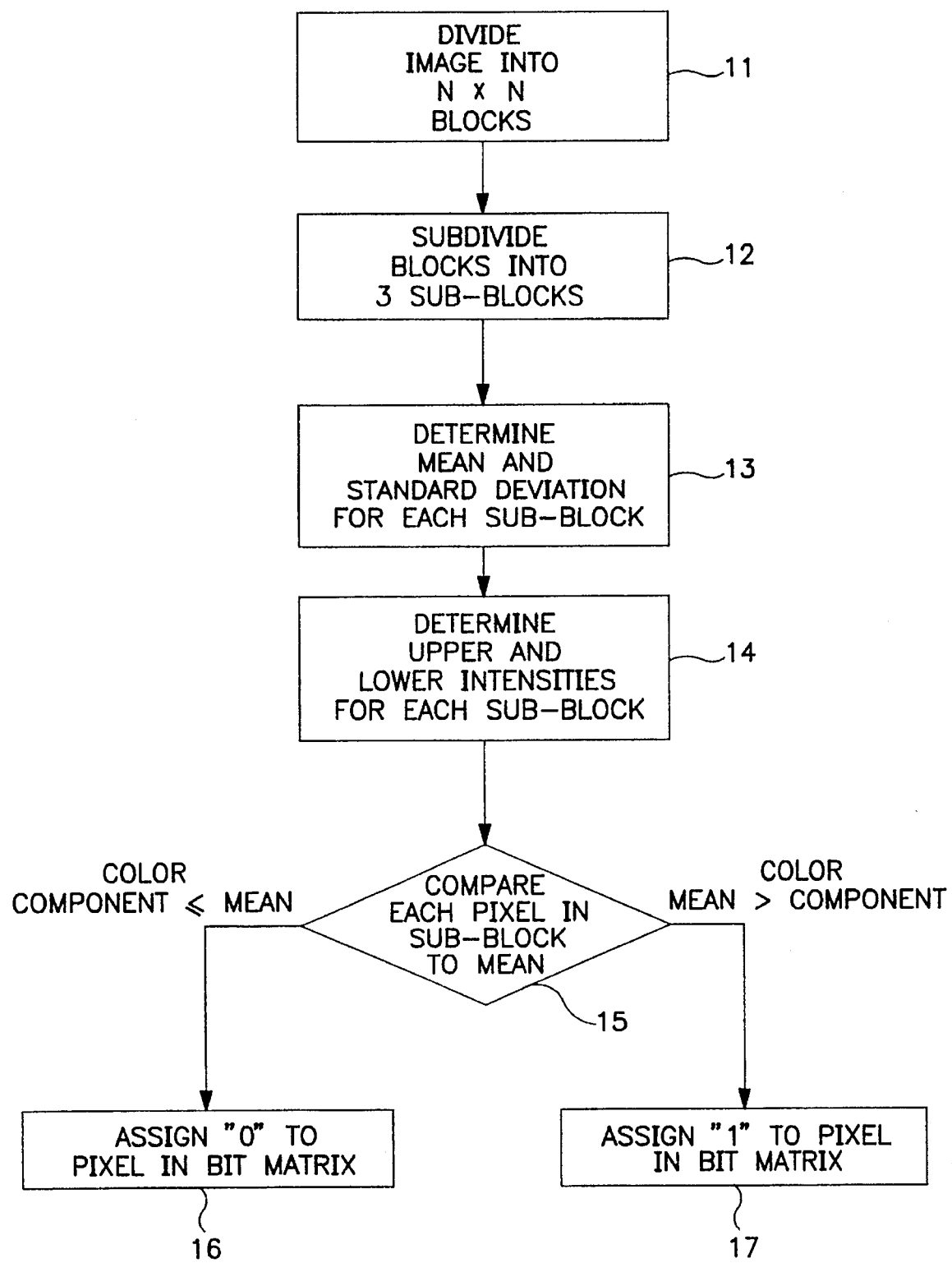
FIG. 1 of the drawings is a flow diagram of a prior art block truncation coding method.

While this invention is susceptible of embodiment in many different forms, there is shown in the drawings and herein will be described in detail, several specific embodiments, with the understanding that the present disclosure is to be considered as an exemplification of the principles of the invention and is not intended to limit the invention to the embodiments illustrated.

A prior art block truncation coding image compression method is shown in FIG. 1. The image to be compressed comprises a two-dimensional array of digital values, with each digital value corresponding to a displayable pixel of the image. For example, each pixel may be represented by a 24-bit digital value, including an 8-bit red color component, an 8-bit green color component, and an 8-bit blue color component. Each 8-bit value is indicative of the intensity of its corresponding color component. In this manner, over 16 million different colors may be represented by a 24-bit value.

In the prior art BTC method of FIG. 1, the 2-dimensional array of digital pixel values is first divided into square NxN blocks of equal size, as shown in step 11. Next, as shown in step 12, each NxN block is further subdivided into three separate sub-blocks. Each sub-block is an NxN array of one color component of the larger NxN block. Each sub-block is, accordingly, an NxN array of 8-bit values, representing red color components, green color components, and blue color components, respectively. Next, as shown in step 13, a mean (average) and a standard deviation value are calculated for each color component sub-block of each NxN block in the array. As shown in step 14, the mean and standard deviation values are employed to determine upper and lower intensity quantization values for each sub-block. The upper intensity quantization value is set to the mean plus the standard deviation for the sub-block. The lower intensity quantization value is set to the mean minus the standard deviation value for the sub-block.

Next, transition is taken to step 15, where each color component value within each sub-block is compared to its corresponding, previously-determined mean value for the sub-block. If the color component value is greater in magnitude than the mean, transition is taken to step 17, and a binary "one" is assigned to the color component in a compressed bit matrix. If, however, the color component value is less than or equal to the mean value for its sub-block, transition is taken to step 16, and a binary "zero" is assigned to the color component in the compressed bit matrix.

In this manner, an image represented by digital pixel values may be represented in compressed form, using the prior art BTC coding technique of FIG. 1, by three one-bit-per-pixel binary matrices, plus three upper quantization values and three lower quantization values for each of the NxN blocks.

For example, if N is set to 4, and 24-bit color unencoded pixels are employed, each color component sub-block is 16 bytes in size. When encoded, each sub-block is represented by a 16-bit binary matrix, plus two 8-bit intensity quantization values, for a total of 32 bits. Accordingly, the prior art block truncation coding method of FIG. 1 achieves a compression ratio of 4:1, requiring 6 bits per pixel, as compared to the initial 24 bits per pixel, to represent the image in compressed, encoded form.

While the prior art BTC encoding method of FIG. 1 may be employed to achieve a visually satisfactory decoded, decompressed image, 6 bits per pixel is often too large for data compression and data expansion methods and circuitry in applications involving the real-time display of motion pictures, such as motion pictures stored in compressed form on a compact disc read only memory (CD-ROM), For such real-time motion picture applications, it is desirable to store consecutive video frames of the motion picture as in as few bits per pixel as possible, in order to fit more information on a individual CD-ROM, and in order to transfer as many bits as possible within a channel of fixed, often limited band width, Accordingly, the present invention is employed to achieve compression ratios of greater than 4 to 1 with respect to proximately-positioned frames of motion picture video data. It has been observed that there are often strong similarities in visual content among adjacent or otherwise proximately-positioned frames of images in a motion picture. Accordingly, the present invention employs interframe analysis to take advantage of these similarities in the encoding process, and to achieve even higher compression ratios.

Figure 2:
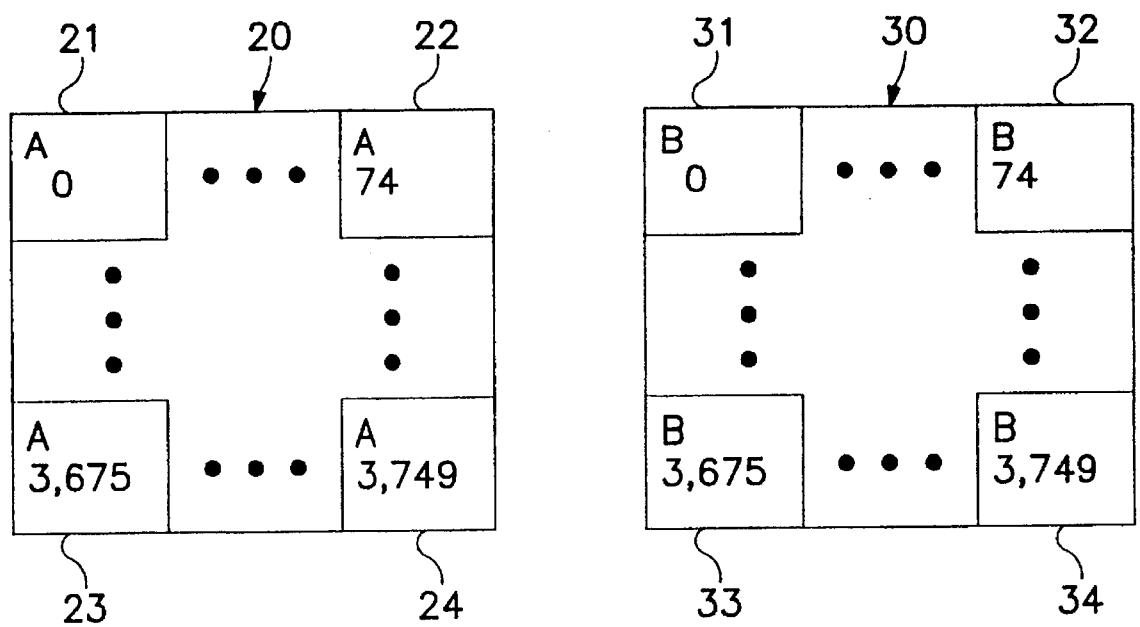
FIG. 2 of the drawings is a block diagram of two adjacent video frames, showing, in particular, the division of each frame into a plurality of blocks of pixels.

A set of two proximately-positioned frames of digitized motion picture video data is shown in FIG. 2 as comprising frame 20 and frame 30. In a preferred embodiment, each frame comprises a 300 pixel-wide by 200 pixel-high array of 24-bit color values. Also, in a preferred embodiment, each video frame is sub-divided into N×N blocks, preferably 4×4 blocks of neighboring pixels. This results in a total of 3,750 blocks per frame, designated block 0 through block 3,749. In frame 20, designated frame A, the upper left-most block is block $A_0$ 21. Similarly, video frame 30, designated frame B includes block $B_0$ 31 in the left-most corner. Correspondingly located blocks within the adjacent video frames are grouped, to create groups of corresponding blocks. For example, block $A_0$ 21 and block $B_0$ 31 form a group of corresponding blocks. Similarly, blocks $A_{74}$ 22 and block $B_{74}$ 32 form a corresponding group; as do blocks $A_{3,675}$ 23 and block $B_{3,675}$ 33; and as do blocks $A_{3,749}$ 24 and Block $B_{3,749}$ 34, in the lower right-most corner of each video frame. In this manner, each block of N×N pixels belongs to a group of corresponding blocks among proximately-positioned video frames.

Although, in an illustrated embodiment, each set of proximately-positioned frames comprises two proximately-positioned frames, and each group of corresponding blocks comprises a group of two blocks, larger sets of proximately-positioned frames, as well as accordingly larger groups of corresponding blocks, may alternatively be used.

Figure 3:
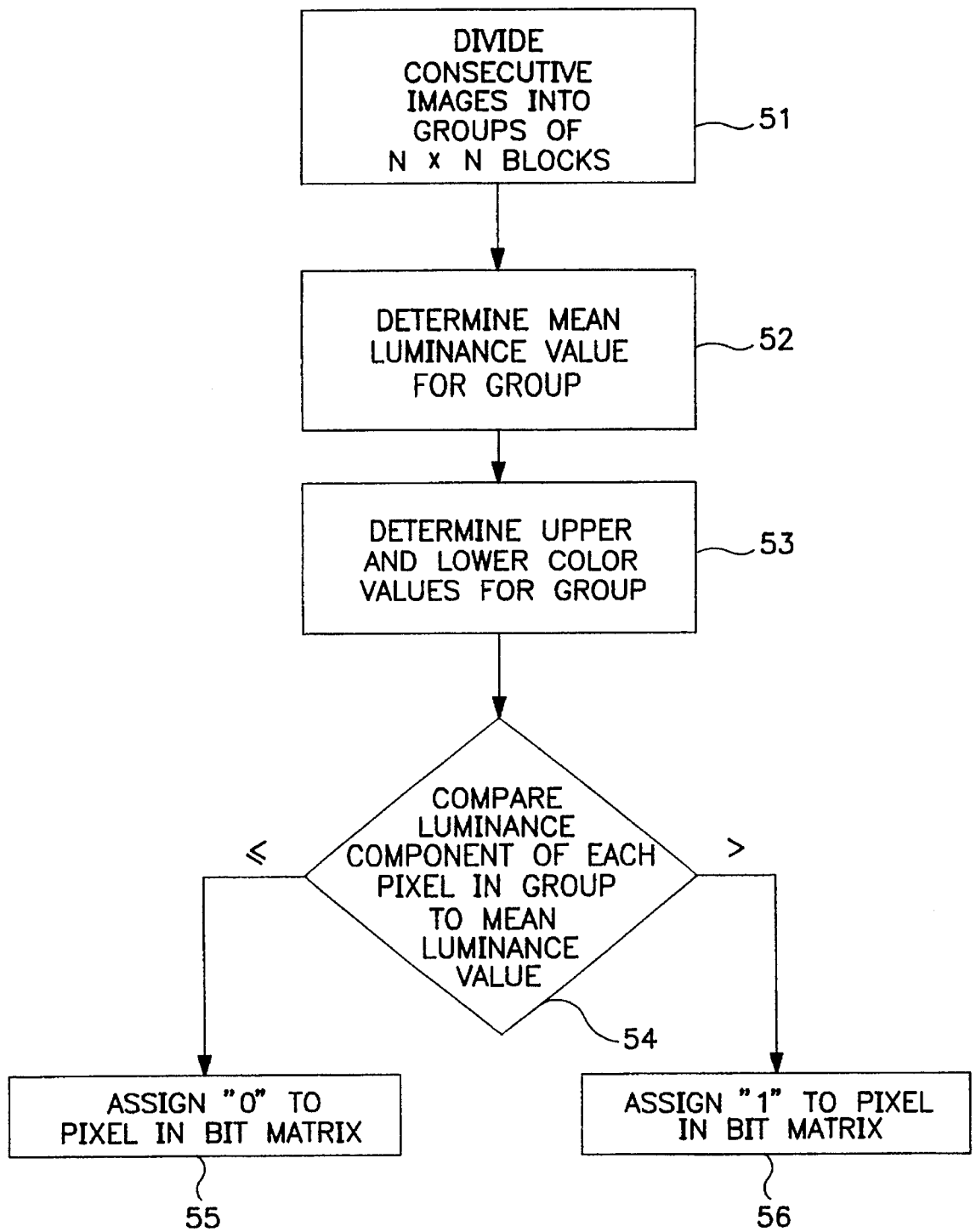
FIG. 3 of the drawings is a flow diagram of the encoding method.

The present method for encoding a sequence of frames of digitized motion picture video data is shown in the flow diagram of FIG. 3. The sequence of frames to be compressed contains a plurality of sets of proximately-positioned frames, wherein each frame contains a .plurality of digital pixel values.

First, as shown in step 51, each frame within the set of proximately-positioned frames is divided into N×N blocks, Each block corresponds to other, similarly positioned blocks within the set of proximately-positioned frames, in order to create a plurality of groups of corresponding blocks.

Next, as shown in step 52, a mean, or average luminance value is determined for each of the corresponding blocks in a group, by averaging a luminance component of each of the pixel values within the group of corresponding blocks. The luminance component may be rapidly approximated from the red, green, and blue color components of the associated pixel. In a preferred embodiment, the luminance value for a pixel is set to 0.5 times the pixel's red color component, plus 0.3 times the pixel's green color component, plus 0.1 times the pixel's blue color component. These color component weighting values are selected to coincide with video images digitized by a VIDEO BLASTER (trademark) image grabber product. The particular weightings applied to the red, green, and blue color components may be varied or adjusted to coincide with a variety of video acquisition products employed to digitize video images.

Next, as shown in step 53, upper and lower color values are determined for each group of corresponding blocks. The upper color value for a group is equal to a combination of the averages of the red, green, and blue color components of each pixel within the group of corresponding blocks having a luminance component which is greater in magnitude than the mean luminance component for the group of corresponding blocks. The upper color value is a concatenation of the three separate red, green, and blue averages, forming an aggregate upper color value having the three averaged color components.

Similarly, the lower color value for each group of corresponding blocks is equal to a combination of the averages of the red, green, and blue color components of each pixel within the group of corresponding blocks which has a luminance component which is less than or equal to the mean luminance component for the group of corresponding blocks. Again, the lower color value is a concatenation of the three separate averages of red, green, and blue color components.

Each pixel within each block is next assigned a one-bit value in a corresponding bit-mapped matrix. As shown in FIG. 3, step 54, the luminance component of each pixel within each group of corresponding blocks is compared with the mean luminance value for the group of corresponding blocks. If the luminance component of a pixel is greater in magnitude than the corresponding mean luminance value, transition is taken to step 56 and the correspondingly-positioned 1-bit value for the pixel in the bit-mapped matrix is assigned a binary "1", indicative of an assignment, or quantization, of the particular pixel to the upper color value for its corresponding group of blocks. If, however, the luminance component of a pixel is less than or equal to the corresponding mean luminance value for the group of blocks, transition is taken to step 55 and a binary "0" is assigned to the pixel in its corresponding location in the bit-mapped matrix, indicative of an assignment, or a quantization, of the particular pixel to the lower color value for the group of corresponding blocks.

Accordingly, by employing the present method, a set of proximately-positioned frames may be represented in compressed, encoded form by a 1-bit per pixel matrix for each frame, a single upper color value for each group of corresponding blocks, and a single lower value for each groups of corresponding blocks.

The present encoding method, as described above, allows video frames of motion picture video data to be represented in significantly less than the 6-bits per pixel of the example BTC prior art method of FIG. 1. In a preferred embodiment, the uncompressed frames of motion picture video data each comprise a 300 pixel wide by 200 pixel high array of 24-bit color values. "N" is set to four, with each frame subdivided into 4×4 blocks. Each 4×4 block, in unencoded form, accordingly contains sixteen 24-bit values, for a total of 48 bytes of information per block.

Using the present encoding method, the video frames may be represented in encoded form in 1.875 bits per aixel. Each 4×4 block is represented in encoded form by 16 bits within the bit-mapped matrix. In addition, a 14-bit upper color value and a 14-bit lower color value is created for each 4×4 block, with each upper or lower color value containing a 5-bit quantized red component, a 5-bit quantized green component, and a 4-bit quantized blue component. Since the present encoding method employs interframe analysis, resulting in shared upper color and lower color values among corresponding groups, or pairs of proximately-positioned blocks, only 7 bits of each 14-bit upper color and lower color value are "allocated" to each individual block within each individual image. Accordingly, a 48 byte unencoded 4×4 block is represented in encoded form by 16 bits for the bit-mapped matrix, 7 bits for the shared upper color value, and 7 bits for the shared lower color value, for a total of 30 bits to represent the 16 pixel block; approximately 1.875 bits per pixel.

in one preferred embodiment, each set of proximately-positioned frames comprises two consecutive video frames. In this preferred embodiment, every frame is compressed, and is represented in encoded form. However, because of speed constraints introduced by the hardware components of conventional compressed-image retrieval circuitry, it is often necessary to create a sequence of compressed, encoded frames using only a subset of the complete sequence of unencoded video frames. In such instances, a portion of the uncompressed video frames must be discarded, rather than be used to produce the sequence of compressed, encoded video frames. Accordingly, in such instances, the sets of proximately-positioned video frames will comprise closely-positioned, but non-consecutive, video frames selected from the complete sequence of unencoded frames.

For example, a conventional CD-ROM drive, which may be employed for retrieval of compressed images stored upon a CD-ROM disc, outputs data at approximately 1.5 million bits per second. In the previously-described example, the present encoding method can be employed to compress 300 pixel by 200 pixel images at a compression level of approximately 1.875 bits per pixel. Accordingly, each 300 pixel by 200 pixel frame is represented in encoded form by approximately 112,500 bits of data. Using the CD-ROM drive data transfer rate of 1.5 M bits per second, approximately 13.33 compressed 300 pixel by 200 pixel frames may be output from the CD-ROM drive each second.

However, most conventional video standards operate at a higher speed than 13.33 frames per second. For example, the NTSC video standard specifies 30 frames per second. If, for example, a conventional NTSC image grabber is employed to obtain the source, uncompressed video frames, only a subset of the 30 frames each second will be encoded, since the CD-ROM drive is limited to playing-back 13.33 frames per second. The remaining, unused frames are "discarded" in the encoding process.

The ratio of total source frames to frames utilized in the encoding process is termed the sub-sample rate. In the present example, the sub-sample rate is 30 divided by 13.33, or approximately 2.25. Accordingly, in the present example, one out of every approximately 2.25 unencoded video frames, or approximately 4 out of every 9, will by selected to be employed in the compression process. The remaining unencoded video frames, approximately 5 out of every 9, will be discarded.

Accordingly, whenever the sub-sampling rate is greater than unity, some unencoded frames will be discarded, and the sets of proximately-positioned frames within the unencoded sequence will not necessarily comprise adjacent frames, but will rather be spaced-apart by one or more intervening, discarded frames. In the present example, only frames numbered 1, 3, 5 and 8 from a sequence of frames numbered 1–9 will be selected to be encoded. The sets of proximately-positioned frames will comprise two sets: a set comprising frames 1 and 3; and a set comprising frames 5 and 8.

In the previous example, a 300-pixel wide by 200-pixel tall image array is employed. However, due to hardware implementation concerns, it is often more convenient to employ a horizontal width of the image array which is a power of two and, moreover, a multiple of sixteen. Accordingly, in one preferred embodiment, an image array width of 320 pixels, rather than 300 pixels, is employed.

Figure 4:
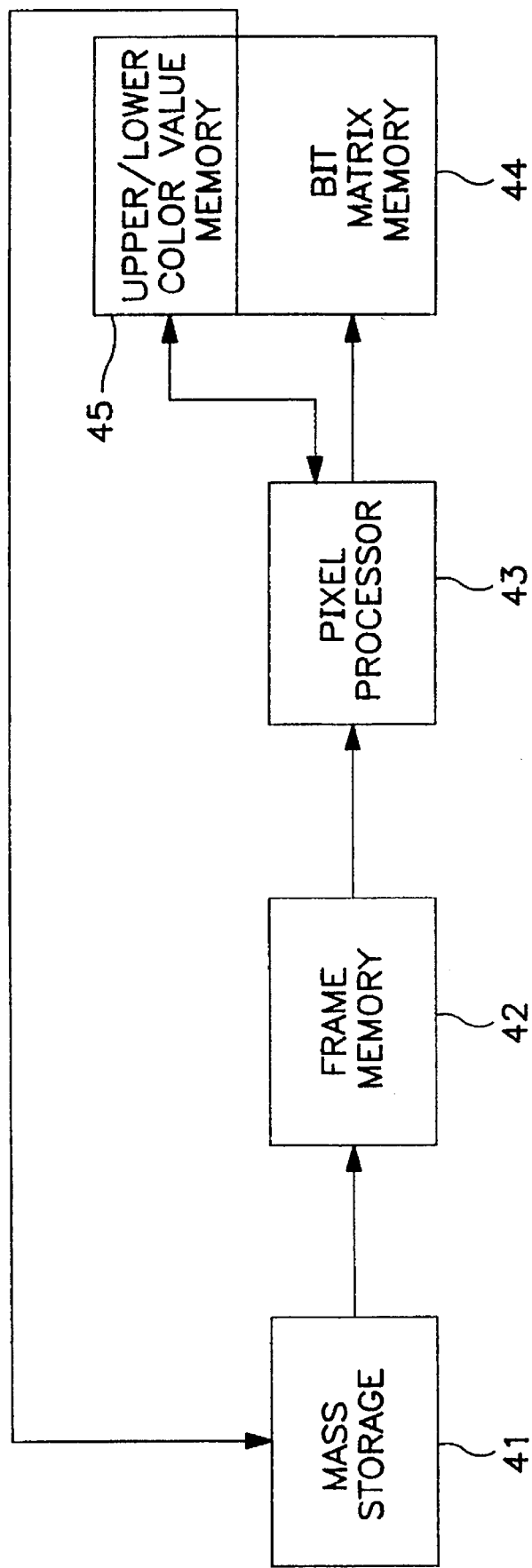
FIG. 4 of the drawings is a schematic block diagram of the encoding circuitry.

The circuitry 40 for performing the encoding method of FIG. 3 is shown in FIG. 4 as comprising mass storage system 41, frame memory 42, pixel processor 43, bit-mapped matrix memory 44, and upper/lower color value memory 45. In a preferred embodiment, encoding circuitry 40 comprises a conventional IBM (trademark) PC-compatible computer system.

Mass storage system 41 preferably comprises a relatively large capacity, nonvolatile digital data storage system, such as a hard disk drive or a tape drive. Proximately-positioned frames of digitized motion picture video data, stored in files within mass storage system 41, are copied to frame memory 42, under the control of pixel processor 43. Frame memory 42 preferably comprises a relatively high speed random access memory, such as static or dynamic random access memory.

As described above, consecutive frames may be selected and copied from mass storage system 41. Alternatively, when the sub-sampling rate is greater than unity, some source frames will be discarded, and proximate but non-consecutive frames will be selected and copied from mass storage system 41. The particular selection of frames for compression is performed by pixel processor 43.

Pixel processor 43, (preferably a microprocessor or digital signal processor), also performs the previously-described steps of logically subdividing each image within frame memory 42 into N×N blocks, averaging the pixel values within frame memory 42 to determine the individual luminance components for each pixel, as well as the mean luminance value for each group of corresponding blocks, and then determines the upper and lower color values for each group of corresponding blocks. The calculated upper and lower color values are stored within temporary storage, designated upper/lower color value memory 45 in FIG. 4. Next, for each corresponding block within each group of proximately-positioned video frames, pixel processor 43 compares each pixel's luminance component to its corresponding mean luminance component for the associated group of corresponding blocks in which the pixel resides. Depending upon the outcome of this comparison, pixel processor 43 will set a corresponding bit in bit matrix memory 44 to either a binary "1" or a binary "0" value, indicative of whether a upper or lower color value has been associated with the corresponding pixel, respectively. Upon the completion of this processing for a group of proximately-positioned video frames, pixel processor 43 will cause the complete bit matrix memory and upper/lower color value memory contents to be transferred back to a data file within mass storage 41, storing in encoded, compressed form the original unencoded sequence of video frames.

in a preferred embodiment, the encoded video frames are stored in pages of encoded data. Each page comprises three matrices, containing the encoded data for two proximately-positioned video frames. The first matrix is the bit-mapped array for the first video frame, with each bit in the matrix indicating whether an upper color value or a lower color value has been assigned to the associated pixel. Similarly, the second matrix is the bit-mapped array for the second video frame, again indicating, for each pixel, whether the upper or lower color value has been assigned to the particular pixel. The third matrix comprises the upper and lower color values themselves, determined for each group of corresponding blocks of proximately-positioned video frames, Upper and lower color values are organized in pairs corresponding to each group of 4×4 blocks from both proximately-positioned video frames. For a 300×200 pixel image, 3,750 pairs of color values are stored.

in a preferred embodiment, data files including the encoded sequence of video data are transferred from mass storage system 41 to a CD-ROM disc, using a conventional compact disc recording or mastering device. Accordingly, the compressed sequence of vide images may be played back, and displayed in uncompressed form, using a CD-ROM player which incorporates the present decoding method, as explained in detail below.

Figure 5:
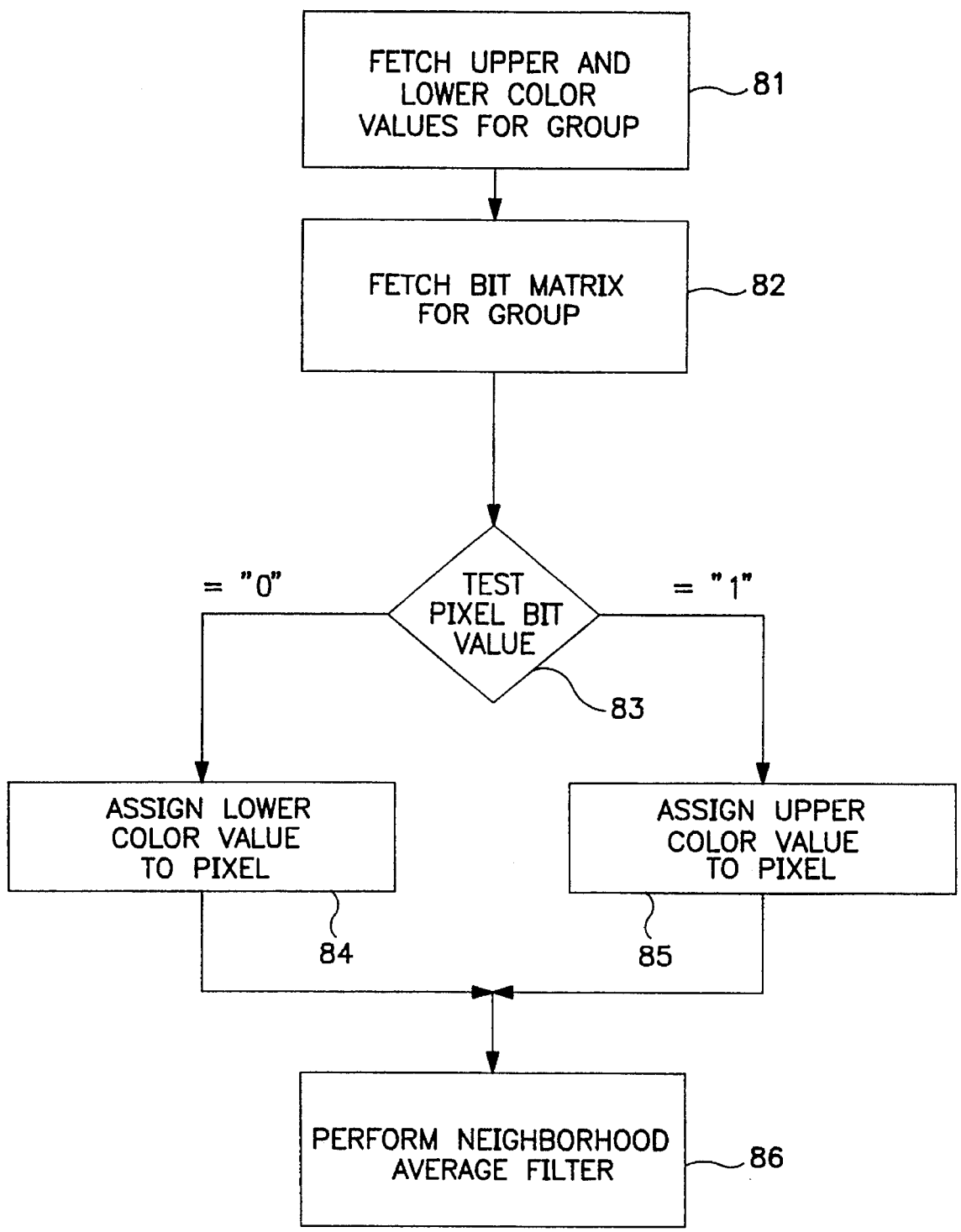
FIG. 5 of the drawings is a flow diagram of the decoding circuitry.

The present method for decoding a sequence of frames of digitized motion picture video data, encoded by the method depicted in FIG. 3, is shown in FIG. 5. First, as shown in step 81, the previously-determined upper color and lower color value for a group of corresponding blocks of pixels within proximately-positioned frames of digitized video data is retrieved from storage memory. Next, as shown in step 82, the portion of the previously-established bit-mapped matrix for the same group of corresponding blocks of pixels is retrieved from storage.

For each bit retrieved in step 82, a comparison is made, as shown in step 83, to determine whether the bit is set to a binary "1" or a binary "0". If a bit value corresponding to a pixel is equal to binary "1", the upper color value, fetched in step 81, is assigned to the pixel in a correspondingly-positioned location in an expanded image matrix, as shown in step 85. If, however, the pixel is equal to binary "0", the lower color value, fetched previously in step 81, is assigned to the pixel in a correspondingly-positioned location in the expanded image matrix.

Steps 81–85 are continually performed for each group of corresponding blocks of pixels within a group of proximately-positioned video frames, in order to decode, or decompress, the encoded video frames into displayable image matrices. Steps 81–85 are accordingly continuously repeated until an entire group of proximately-positioned frames are decoded.

The reconstructed images obtained by the present encoding and decoding methods may contain "blocking effects"— visual discontinuities at the boundaries separating the N×N blocks in the decoded image. Conventional filtering techniques maybe employed to attenuate these abrupt changes which may occur at block boundaries, so as to create a more acceptable decompressed image. Care must be taken in choosing a filtering technique, however, so as to avoid the removal of true edges from the reconstructed image.

One acceptable filtering technique is a 2×2 neighborhood averaging filter. In a 2×2 neighborhood averaging filter, each color component of a pixel is reassigned the average of the color component for the pixel, as well as the three neighboring pixels directly to the right, below, and diagonally to the below-right of the given pixel.

In a preferred embodiment, a one-dimensional, 2×1 neighborhood averaging filter is instead employed, in order to reduce hardware complexity and cost. In the 2×1 neighborhood averaging filter, adjacent pixels within horizontal rows are averaged. Each color component within a pixel is reassigned the average of the pixels own color component, plus the color component of the pixel immediately to the right, in the same horizontal row. In this manner, each horizontal row of an N×N block can be processed individually. With a 2×2 neighborhood averaging filter, adjacent rows must be processed simultaneously, in order to obtain the three adjacent pixels for each pixel to be filtered by the 2×2 filter. Of course, this 2×1 neighborhood averaging filter will only alleviate discontinuities along the vertical boundaries between the N×N blocks.

Figure 6:
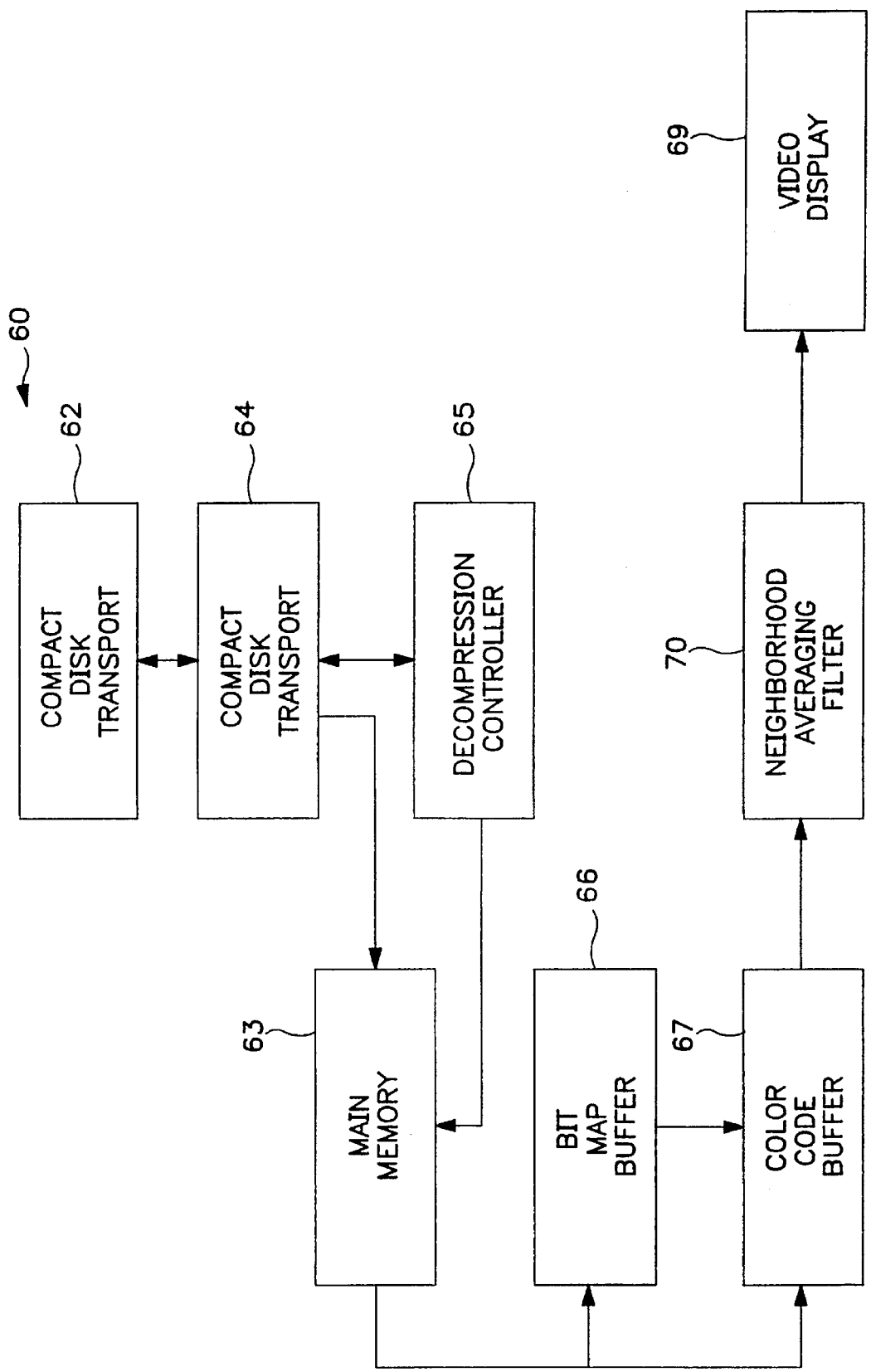
FIG. 6 of the drawings is a schematic block diagram of the decoding circuitry.

The circuitry for implementing the decoding method depicted in FIG. 5 is shown in FIG. 6. In a preferred embodiment, the decoding circuitry is employed within a CD-ROM player 60. CD-ROM player 60 includes compact disc transport 62, which accepts conventional CD-ROMs. Digital data representing compressed, encododed video images are transferred from compact disc transport 62 to main memory 63 via compact disc interface 64. Main memory 63 preferably comprises a random access memory large enough to store a group of proximately-positioned compressed video images.

Decompression controller 65, which preferably includes a microprocessor or a microcontroller as well as a Direct Memory Access (DMA) channel and controller, transfers portions of the bit-mapped matrix for compressed images from main memory 63 to bit-map buffer 66, and transfers corresponding upper color code values and lower color code values from main memory 63 to color code buffer 67.

Bit-map buffer 66 comprises two 16-bit wide parallel-in-serial-out shift registers. These shift registers operate in "ping pong" fashion (i.e., one shift register is written to from main memory 63, while the contents of the other shift register is being read out. When one buffer is full and the other empty, their respective read-write functions are reversed). Each encoded bit-mapped matrix is decoded in row order. Accordingly, each 16-bit shift register within bit-map buffer 66 stores a horizontal row of 16 pixels, spread across four adjacent 4×4 blocks.

For each horizontal row of four adjacent blocks stored within bit map-buffer 66 for processing, color code buffer 67 stores the corresponding eight upper/lower color codes for the four 4×4 blocks. These eight color codes comprise four 14-bit upper color codes, and four 14-bit lower color codes, with each 4×4 block having a corresponding upper and lower color code. Each 14-bit color code includes a 5-bit red color component, a 5-bit green color component, and a 4-bit blue color component. Color code buffer 67 includes two sets of 8-word memory locations, again operating in ping-pong fashion. One set of color codes may be written to one 8-word buffer, while the other 8-word buffer is read for output purposes.

In operation, 16-bit packets comprising a row of four adjacent blocks within a compressed bit-mapped matrix are loaded in parallel into bit-map buffer 66 from main memory 63, and then serially shifted out using a pixel clock, also known as a dot clock. The data shifted serially out of bit-map buffer 66 is used to complete a read address to color code buffer 67. In particular, the value shifted serially out of bit-map 66 selects a memory location to determine whether an upper color code value (for binary "1" values shifted out of bit-map buffer 66) or a lower color code value (for binary "0" shifted out of bit-map buffer 66) for a 4×4 block is to be read out of color code buffer 67. In this manner, for each pixel within each video frame, a corresponding upper color code or lower color code value is generated, as determined by the contents of bit-map buffer 66. A decompressed, decoded image is generated, as each row of the 4×4 blocks of adjacent video frames are processed as described above.

Figure 7:
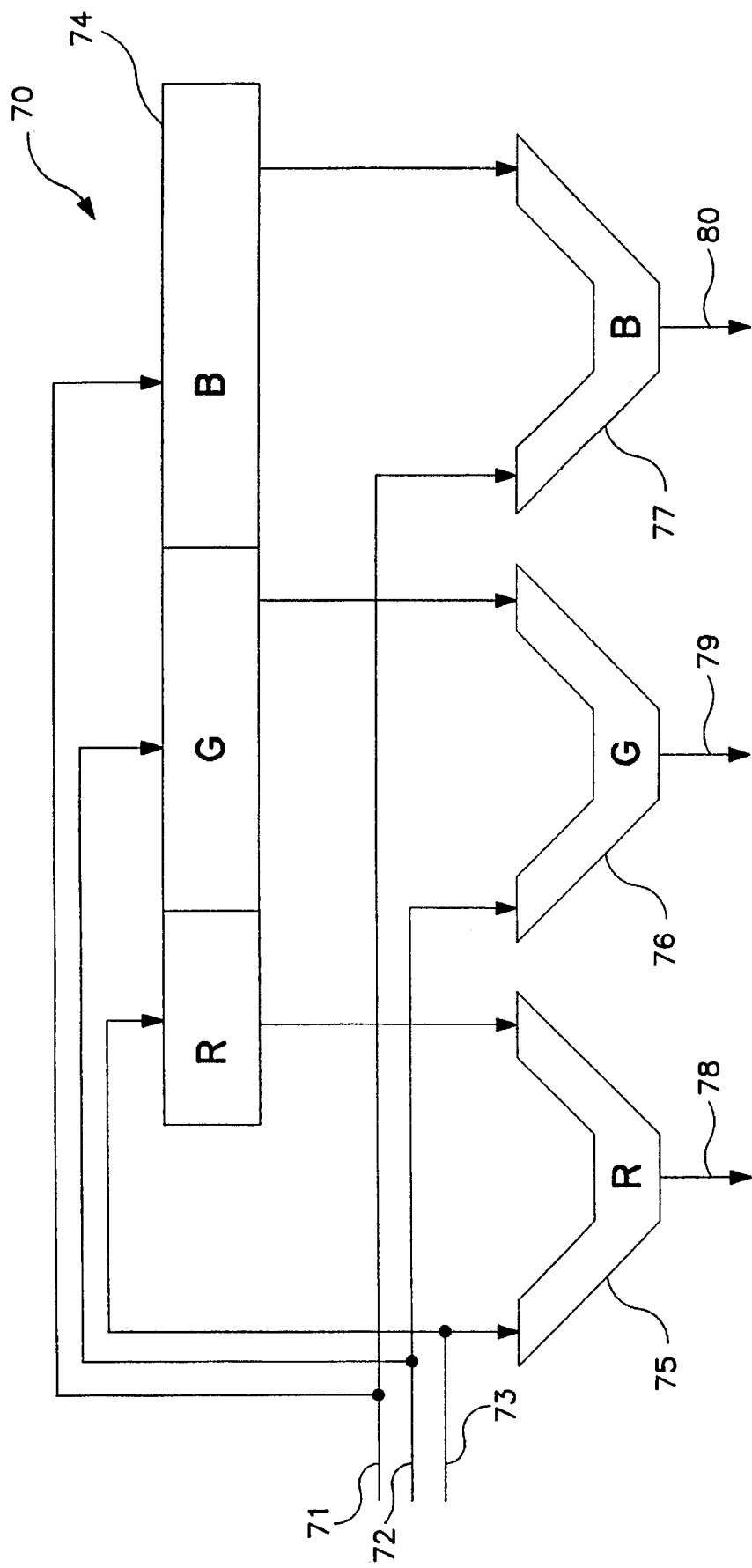
FIG. 7 of the drawings is a schematic diagram of the neighborhood averaging filter of the decoding circuitry.

Neighborhood averaging filter 70 receives the color code values output from color code buffer 67, and performs the previously-described 2×1 neighborhood averaging filter. The filtered pixel values are finally displayed upon video display 69. Neighborhood averaging filter 70 is shown in detail in FIG. 7 as comprising previous pixel storage register 74, red color component adder 75, green color component adder 76, and blue color component adder 77. Neighborhood averaging filter 70 receives 14-bit pixel values from color code buffer 67, including a 5-bit red color component 71, a 5-bit green color component 72, and a 4-bit blue color component 73. Each color component is fed to a corresponding location within storage register 74, as well as a corresponding color component adder. The color component values present at the outputs of storage register 74 are coupled to additional inputs of respective color component adders 75, 76, and 77. Storage register 74 is clocked by the pixel clock, or dot clock. Accordingly, when color component inputs 71, 72, and 73 change at a time subsequent to a rising edge of the pixel clock, both the present color component value (represented by signals 71, 72, and 73) as well as the immediately previous color component values (as represented by the output pins of storage register 74) are presented to color component adders 75, 76, and 77. Accordingly, output 78 of red color component adder 75 is a summation of the present and immediately previous red color components for two adjacent decompressed, expanded pixels. Similarly, outputs 79 and 80 of green color component adder 76 and blue color component adder 77, respectively, are also summations of their respective current and immediately previous color component values. Moreover, the least-significant bit of each color component adder is left unused or discarded, in order to provide a divide-by-two operation. In this manner, each color component adder performs an average of a present and immediately previous color component value, for two adjacent pixels in a horizontal row. Outputs 78, 79, and 80 collectively form the averaged pixel values, output to video display 69 (FIG. 6).

The present encoding method and encoding apparatus, as well as the present decoding method and decoding apparatus, may also be applied to the compression and decompression of still images, in addition to motion picture video. When applied to still images, each image is encoded and decoded in isolation, without interframe analysis. Essentially, the previously-described apparatuses and methods are employed, using the assumption that each group of proximately-positioned video frames comprises a group of size one. Each group of corresponding blocks accordingly comprises a single N×N block within a single still frame.

With respect to the encoding of still images, the above-described mean luminance values, upper color values, and lower color values are each determined for each individual N×N block of the still frame. An encoded still image is accordingly represented by a one-bit per pixel matrix for the frame, an upper color value for each N×N block within the frame, and a lower color value for each N×N block within the frame.

With respect to the decoding of compressed still images, each one-bit value in the encoded, one-bit per pixel matrix is tested to determine if it has a value indicative of an upper or lower color value. The corresponding, predetermined upper color value or lower color value for the associated N×N block is assigned to the pixel, depending upon whether the tested pixel value is a binary "0" or a binary "1".

Although, in a preferred embodiment, the present encoding and decoding methods are disclosed in the context of a CD-ROM environment, other applications are also contemplated. For example, the compressed images maybe stored within a mass storage system, such as a hard disk drive. When viewing of a particular images is required, data maybe transferred directly from the mass storage system to decoding circuitry, in order to display the reconstructed, expanded image. Moreover, the present encoding and decoding methods maybe employed to transfer compressed images from one location to another, such as via a conventional local or wide area network, or via a telephone link employing a modem at both the sending and receiving stations. In such applications, the present encoding and decoding methods allow compressed images to be transferred using reduced bandwidth, and reduced transmission time, as compared to transfers of uncompressed video images.

Moreover, while the present encoding and decoding methods, and associated circuitry, involve operations upon the red, green, and blue color components of digital pixel values, operations using alternative color representations are also contemplated. For example, colors maybe represented in terms of hue, saturation, and intensity (HSI), instead of red, green, and blue color components. If so desired, the previously-described upper color values and lower color values, and the associated methods and circuitry, may be readily modified to accommodate pixels in HSI representation.

The foregoing description and drawings merely explain and illustrate the invention and the invention is not limited thereto except in so far as the appended claims are so limited, as those skilled in the art who have the disclosure before them will be able to make modifications and variations therein without departing from the scope of the invention.

What is claimed is:

1. A method for encoding a sequence of frames of digitized motion picture video data, the sequence of frames containing a plurality of sets of proximately-positioned frames within the sequence, each frame within the sequence of frames containing a plurality of digital pixel values, the method comprising the steps of:

dividing each frame within each set of proximately-positioned frames of digitized motion picture video data into a plurality of blocks of pixels, each block corresponding to at least one other block within at least one proximately-positioned frame, so as to create a plurality of groups of corresponding blocks;

averaging a luminance component of each of the pixel values within each group of corresponding blocks to generate a mean luminance value for each group of corresponding blocks;

determining an upper color value for each group of corresponding blocks, the upper color value being equal to a combination of averages of color components of pixels within the group of corresponding blocks having a luminance component greater in magnitude than the mean luminance component for the group of corresponding blocks;

establishing a lower color value for each group of corresponding blocks, the lower color value being equal to a combination of averages of color components of pixels within the group of corresponding blocks having a luminance component which is not greater in magnitude than the mean luminance component for the group of corresponding blocks;

comparing the luminance components of each pixel within each block with the mean luminance value for the corresponding group of blocks;

setting a one-bit value in a one-bit per pixel matrix to a first binary level when the luminance component of an associated pixel value is greater in magnitude than the corresponding mean luminance value; and setting a one-bit value in a one-bit per pixel matrix to a second binary level when the luminance component of an associated pixel value is not greater in magnitude than the corresponding mean luminance value;

whereby each set of proximately-positioned frames may be represented in encoded form by a one-bit per pixel matrix for each frame, a single upper color value for each group of blocks, and a single lower color value for each group of blocks.

2. The method according to claim 1, wherein each of the sets of proximately-positioned frames comprises two non-consecutive frames.

3. The method according to claim 1, wherein each of the sets of proximately-positioned frames comprises two consecutive frames.

4. The method according to claim 1, wherein the color components comprise a red color component, a green color component, and a blue color component.

5. A method for decoding an encoded sequence of frames of digitized motion picture video data to produce a decoded sequence of frames containing a plurality of sets of consecutive frames, each frame within the sequence of frames containing a plurality of digital pixel values representing a plurality of pixels, each frame within each set of consecutive frames being divided into a plurality of blocks of pixels, each block corresponding to at least one other block within a consecutive frame so as to create a plurality of groups of corresponding blocks, the encoded sequence of frames comprising an upper color value for each group of corresponding blocks, a lower color value for each group of corresponding blocks, and a sequence of one-bit values, each one-bit value corresponding to a pixel, the upper color value being equal to a combination of averages of color components of pixels within the group of corresponding blocks having a luminance component greater in magnitude than a mean luminance component for the group of corresponding blocks, the lower color value being equal to a combination of averages of color components of pixels within the group of corresponding blocks having a luminance component which is not greater in magnitude than the mean luminance component for the group of corresponding blocks, each one-bit value being set to a first binary level when a luminance component of an associated pixel value is greater in magnitude than the corresponding mean luminance value, each one-bit value being set to a second binary level when the luminance component of the associated pixel value is not greater in magnitude than the corresponding mean luminance value, the method comprising the steps of:

testing each one-bit value of the sequence of one-bit values to determine if it has a value indicative of an upper color value;

assigning the upper color value for a group of corresponding blocks to each one-bit value in the sequence of one-bit values which is within the group of corresponding blocks and has a value indicative of an upper color value; and assigning the lower color value for a group of corresponding blocks to each one-bit value in the sequence of one-bit values which is within the group of corresponding blocks and has a value indicative of an lower color value.

6. The method according to claim 5, wherein the color components comprise a red color component, a green color component, and a blue color component.

7. The method according to claim 5, wherein the method further includes the step of filtering the decoded sequence of frames by averaging values of adjacent pixels within each decoded frame.

8. The method according to claim 7, wherein the step of filtering the decoded sequence of frames by averaging values of adjacent pixels within each decoded frame comprises the steps of:

averaging red color component values of adjacent pixels within each decoded frame to form a mean red value;

averaging green color component values of adjacent pixels within each decoded frame to form a mean green value;

averaging blue color component values of adjacent pixels within each decoded frame to form a mean blue value; and combining the mean red value, mean green value, and mean blue value to form a filtered value for the adjacent pixels.

9. A method for encoding a frame of digitized video data, the frame containing a plurality of digital pixel values, the method comprising the steps of:

dividing the frame into a plurality of blocks of pixels;

averaging a luminance component of each of the pixel values within each block to generate a mean luminance value for the corresponding block;

determining an upper color value for each block, the upper color value being equal to a combination of averages of color components of pixels within the block having a luminance component greater in magnitude than the mean luminance component for the block;

establishing a lower color value for each block, the lower color value being equal to a combination of averages of color components of pixels within the block having a luminance component which is not greater in magnitude than the mean luminance component for the block;

comparing the luminance components of each pixel within each block with the mean luminance value for the block;

setting a one-bit value in a one-bit per pixel matrix to a first binary level when the luminance component of an associated pixel value is greater in magnitude than the corresponding mean luminance value; and setting a one-bit value in a one-bit per pixel matrix to a second binary level when the luminance component of an associated pixel value is not greater in magnitude than the corresponding mean luminance value;

whereby each frame may be represented in encoded form by a one-bit per pixel matrix for the frame, a single upper color value for each block, and a single lower color value for each block.

10. A method for decoding an encoded frame of video data, the frame containing a plurality of digital pixel values representing a plurality of pixels, the frame being divided into a plurality of blocks of pixels;

the encoded frame comprising an upper color value for each block, a lower color value for each block, and a sequence of one-bit values, each one-bit value corresponding to a pixel;

the upper color value for each block being equal to a combination of averages of color components of pixels within the block having a luminance component greater in magnitude than a mean luminance component for the block;

the lower color value for each block being equal to a combination of averages of color components of pixels within the block having a luminance component which is not greater in magnitude than the mean luminance component for the block;

each one-bit value being set to a first binary level when a luminance component of an associated pixel value is greater in magnitude than the corresponding mean luminance value;

each one-bit value being set to a second binary level when the luminance component of the associated pixel value is not greater in magnitude than the corresponding mean luminance value;

the method comprising the steps of:

testing each one-bit value of the sequence of one-bit values to determine if it has a value indicative of an upper color value;

assigning the upper color value for a corresponding block to each one-bit value in the sequence of one-bit values which is within the corresponding block and has a value indicative of an upper color value; and assigning the lower color value for a corresponding block to each one-bit value in the sequence of one-bit values which is within the corresponding block and has a value indicative of an lower color value.

* * * * *

UNITED STATES PATENT AND TRADEMARK OFFICE
CERTIFICATE OF CORRECTION

PATENT NO. : 5,619,591
DATED : April 8, 1997
INVENTOR(S) : Wai M. Tsang and Ching K. Chan It is certified that error appears in the above-indentified patent and that said Letters Patent is hereby corrected as shown below:

| | |
|---|---|
| Col. 5, line 16 | After (CD-ROM) delete "," and insert instead --.--. |
| Col. 5, line 22 | After width delete "," and insert instead --.--. |
| Col. 5, line 66 | After blocks delete "," and insert instead --.--. |
| Col. 7, line 6 | Delete aixel and insert instead --pixel--. |
| Col. 7, line 27 | Delete "in" and insert instead --In--. |
| Col. 9, line 7 | Delete "in" and insert instead --In--. |
| Col. 9, line 21 | After frames delete "," and insert instead --.--. |
| Col. 9, line 25 | Delete "in" and insert instead --In--. |

Signed and Sealed this

Seventeenth Day of March, 1998

Attest:

BRUCE LEHMAN

Attesting Officer

Commissioner of Patents and Trademarks